United States Patent [19]

Ferrali

[11] Patent Number: 5,650,064
[45] Date of Patent: Jul. 22, 1997

[54] AUTOMATIC DEVICE FOR THE REGENERATION OF A BED OF ION-EXCHANGING RESINS

[75] Inventor: Luigi Ferrali, Bagno A Ripoli, Italy

[73] Assignee: S.I.A.T.A. Societa' Italiana Apparecchiature Trattamento Acque S.p.A., Florence, Italy

[21] Appl. No.: 501,937

[22] Filed: Jul. 13, 1995

[30] Foreign Application Priority Data

Jul. 18, 1994 [IT] Italy .................. MI94A1491

[51] Int. Cl.$^6$ .................. B01D 17/12; C02F 5/00
[52] U.S. Cl. .................. 210/97; 137/599.1; 137/627.5; 210/141; 210/190; 210/269
[58] Field of Search .................. 210/139, 140, 210/142, 141, 143, 190, 191, 269, 278; 137/627.5, 599.1

[56] References Cited

U.S. PATENT DOCUMENTS

| 2,321,267 | 6/1943 | Van Der Werff . | |
| 2,323,947 | 7/1943 | Van Der Werff . | |
| 2,393,076 | 1/1946 | Van Der Werff | 137/627.5 |
| 2,592,353 | 4/1952 | Stevenson | 137/627.5 |
| 2,646,072 | 7/1953 | Sebald | 210/141 |
| 2,665,251 | 1/1954 | Menoenhall | 210/141 |
| 4,374,025 | 2/1983 | Loke | 210/140 |

FOREIGN PATENT DOCUMENTS

| 1 555 124 | 12/1968 | France . |
| 2 647 102 | 11/1990 | France . |
| 438 812 | 11/1953 | United Kingdom . |
| 2 094 660 | 9/1982 | United Kingdom . |

Primary Examiner—Joseph W. Drodge
Attorney, Agent, or Firm—Oblon, Spivak, McClelland, Maier & Neustadt, P.C.

[57] ABSTRACT

An automatic device for the regeneration of a bed of ion-exchanging resins is constituted by a valve body internally provided with two communicating seats, in whose inside pistons which are caused to move by a couple of cams keyed on a motor-shaft slide. The valve body is provided with openings, alternately intercepted by the pistons, to realize different flows of the fluid. In running conditions, water passes through a tank containing a bed of ion-exchanging resins, whose regeneration takes place in counter-current with solutions of sodium salts. This operating stage and the following one of resin washing are carried out according to an automatic sequence by way of cams, which act on the piston.

7 Claims, 3 Drawing Sheets

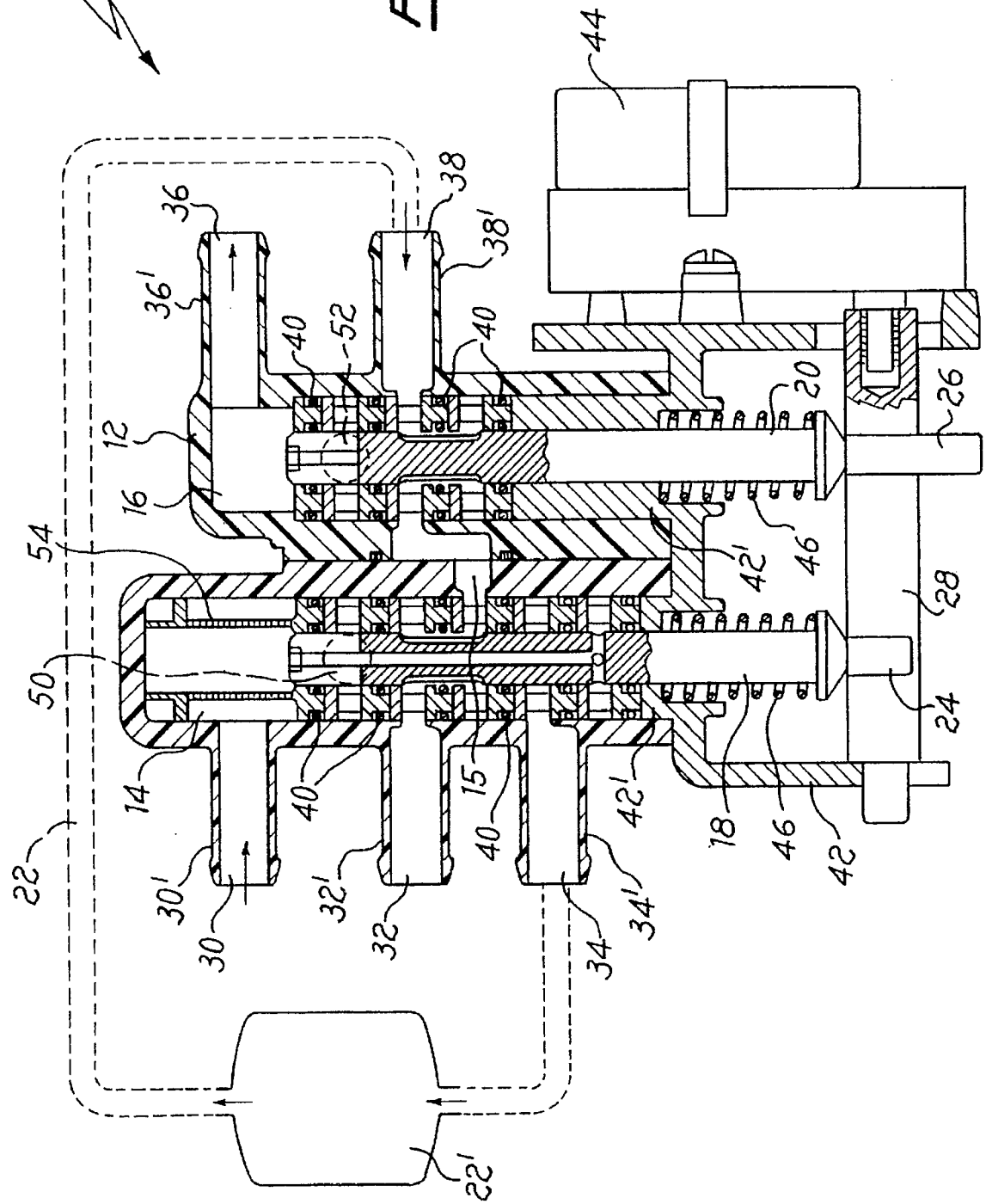

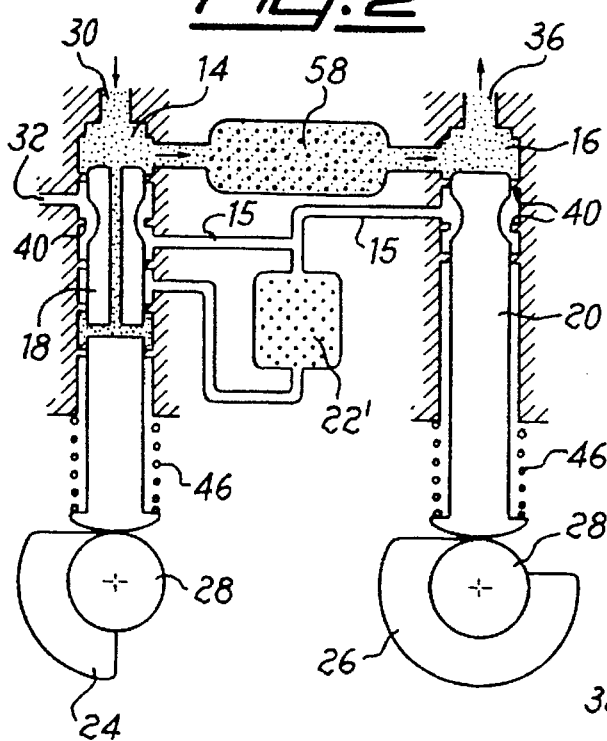
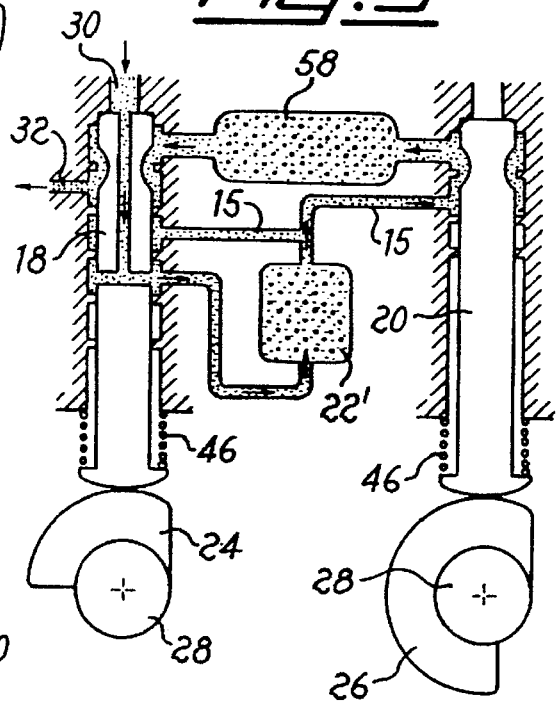
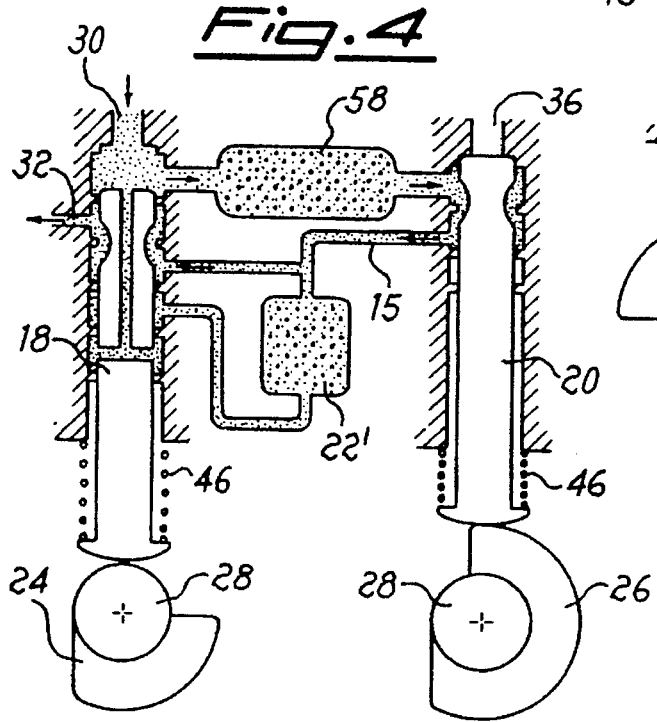

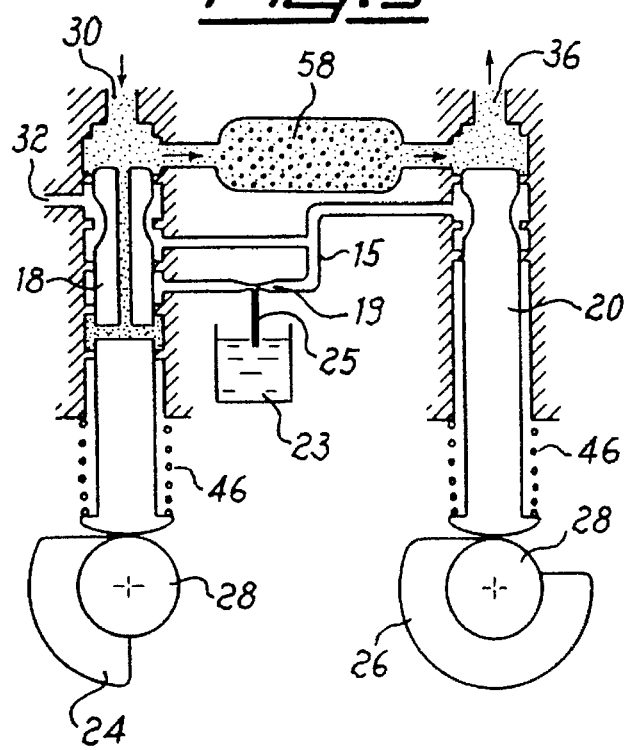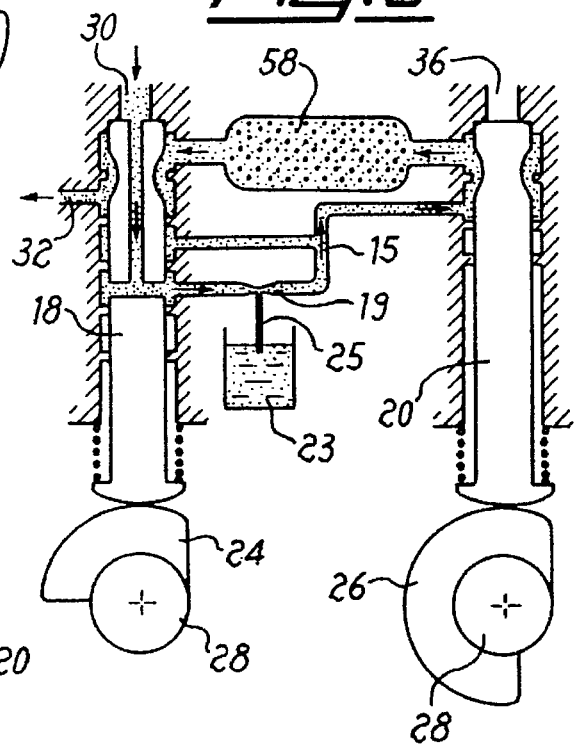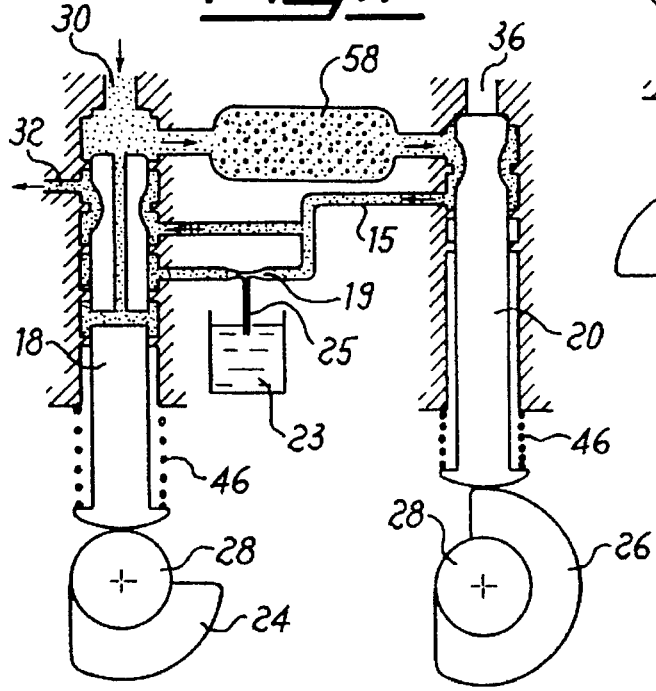

AUTOMATIC DEVICE FOR THE REGENERATION OF A BED OF ION-EXCHANGING RESINS

BACKGROUND OF THE INVENTION

The present invention relates to an automatic device for the regeneration of a bed of ion-exchanging resins.

More particularly, the present invention relates to an automatic device for the regeneration of a bed of ion-exchanging resins; especially suitable to be applied in electric houshold appliances, whose resin bed, which realizes a decalcification of water, may be regenerated in countercurrent, by means of automatic and schedulable sequences.

DESCRIPTION OF PRIOR ART

As is known, all natural waters contain dissolved substances, which are present in different amounts according to the sources which feed them and the terrains they pass through. Drinking water, distributed by water mains and utilized in households, must sometimes be treated to reduce their hardness, due especially to the contents in soluble calcium and magnesium salts.

In fact, it is known that a high hardness water may cause serious inconveniences to electric household appliances, such as washing machines, dish-washing machines, coffee-machines, drink-vendors in general, as the bicarbonates they contain breakdown under the action of heating into carbonates which progressively encrust feed and drain pipes, nozzles and resistances.

To obviate this drawback, decalcifying apparatuses are sometimes installed, in correspondence to the point of connection with the water mains. Such decalcifying apparatuses have a main drawback of needing regular maintenance interventions, to maintain their effectiveness. These interventions are often laborious and give rise therefore to high costs.

Decalcifying devices are also known which are directly applied to household appliances, for instance dish-washing machines and coffee-machines. Also in these cases, however, remarkable drawbacks are found, which are associated especially to the complicated working of said devices; in fact, their activation requires the use of electro-valves which may get dirty and therefore jam or, still worst, burn, which leads to unavoidingly expensive and laborious repair interventions.

SUMMARY OF THE INVENTION

An object of this invention is to obviate the aforementioned drawbacks.

More particularly, an object of this invention is to realize an automatic device for the regeneration of a bed of ion-exchanging resins, applicable especially to electric household appliances, which does not require the use of complicated and deteriorating operating systems and/or expensive and laborious maintenance interventions.

A further object of this invention is to provide users with an apparatus which does ensure a high degree of resistance and reliability in the long run, in an easy and economic manner.

According to this invention, these and further objects are reached by an automatic device for the regeneration of a bed of ion-exchanging resins, which, in its general principle, is charatcterized in that it is operatable used on sequences planned according to water hardness. The automatic device of this invention comprises a valve body wherein two sliding seats are obtained for as many pistons whose lower ends come alternately in touch with a shaft and a cam.

BRIEF DESCRIPTION OF THE DRAWINGS

The structural and functional characteristics of the automatic device of this invention will be better clarified by the following description, wherein reference is made to the attached drawings which show a preferred non limitative embodiment, wherein:

FIG. 1 shows the partly sectioned schematic view of the device of this invention, in operating conditions;

FIG. 2 shows a schematic view of the device according to the stage of FIG. 1, to stress the position of the cams which cause the movement of the distributing pistons;

FIG. 3 shows a schematic view of the device in the resin regeneration stage, to stress the position of the cams;

FIG. 4 shows a schematic view of the device during the washing stage following the regeneration stage, to stress the position of said cams; and FIGS. 5, 6 and 7 show the schematic views of the three stages shown in FIGS. 2, 3 and 4 respectively of a device which may be provided, alternately, with a Venturi ejector.

DESCRIPTION OF THE PREFERRED EMBODIMENTS

With reference to FIG. 1, the automatic device for the regeneration of a bed of ion-exchanging resins, of this invention, globally indicated by 10, comprises a valve body 12 of any form and size; two coupled seats 14, 16, obtained in said body 12, communicating through a common portion 15; two pistons 18, 20, sliding in each of said seats 14, 16; and movement means for said pistons. Said movement means comprise a couple of cams 24, 26, keyed on a motor-shaft 28. The valve body 12, preferably made from plastic material, is provided with several openings obtained along the parts which circumscribe seats 14, 16 and extended externally in as many tangs. On two of said tangs, respectively obtained in the upper part of seat 14 and the central part of seat 16, tubular pipes are fitted on or inserted in, which are indicated in hatching by 22, forming a circuit which connects to a container 22' containing sodium salt, tipically sodium chloride. In particular, the part of seat 14 which houses piston 18 is provided with three superposed openings 30, 32, 34, preferably aligned to one another and extended in the respective tangs 30', 32', 34'.

Along the adjoining part of seat 12, in which piston 20 is slidingly housed, two analogous openings are obtained, indicated by 36, 38 and extended likewise in tangs 36', 38'.

Said openings are alternately intercepted by pistons 18, 20, on which a plurality of sealing toric rings 40 is fitted on, during their sliding within seats 14, 16. The sliding of pistons 18, 20 is obtained by the movement of shaft 20 which causes cams 24, 26 to rotate. A support 42 is integral with the lower part of the valve body 12, which supports said shaft 28, connected in its turn with a movement unit 44. Said support 42 is provided in the upper part with two drilled extensions 42' which engage in the lower part of each seat 14, 16. On the lower of pistons 18, 20, protruding through the openings of extensions 42', a spring is fitted on which pushes said pistons until they get in touch with cams 24, 26. The valve body 12 is further provided with openings 50, 52, obtained in the upper parts of seat 14, 16 respectively, and connected, through flexible or rigid pipes, to a tanks containing ion-exchanging resins.

In the upper portion of seat 14, corresponding to opening 30 through which the main fluid is let in body 12, a generic filter 54 is located. The fluid gets in through opening 30 of seat 14 and, having followed the set path according to the arrangement of pistons 18, 20—as will be explained in detail later on—comes out of body 12 through opening 36, formed at the upper end of seat 16.

Before the utilization which takes place after the coming out from opening 36, the fluid which gets in body 12, typically drinking water distributed through the mains, passes through a tank 58 containing ion-exchanging resins, to remove the soluble salts which cause its hardness. The tank 58 is shown in FIGS. 2 through 7, to which reference is now made to describe the working of the device of this invention.

FIG. 2 schematically shows said device in the operating or service condition, which provides, as indicated by the arrows, for the entry of the raw fluid through opening 30, its passing through the bed of resins contained in tank 58, and the following delivery for use. In this condition, both pistons 18, 20 are lowered relatively to the upper ends of seats 14, 16, as the greater radius portions of cams 24, 26, keyed on shaft 28 or two analogous coupled shafts, do not act on the same pistons. As a consequence, springs 46 are not subject to compression and the lower end of said pistons 18, 20 gets in touch with the shaft or shafts 28. Following the flow of a given quantity of raw water, the resins contained in container 58 become saturated with ions Ca++ and Ng++; therefore, the regeneration of said resins become necessary. This regeneration is carried out according to known systems with a solution of sodium salts, typically NaCl, to obtain the replacement of calcium and magnesium ions—which pass in solution—with sodium ions.

This regeneration stage, whose diagram is shown in FIG. 3, involves the activation of shaft or shafts 28, which, by rotating clockwise or counter clockwise, cause the greater radius portions of cams 24, 26 to act on the lower end of pistons 18, 20. Said rotation, equal, by way of example, to a quarter-rotation, causes pistons 18, 20 to slide upwards in the respective seats 14, 16, compressing springs 46, until they meet the upper end-of-stroke point obtained in said seats. As shown by the arrows, the raw water gets in the container of solid salt 22' and dissolves it by touch in a solution comprised, by way of example, between 10 and 15%; then it passes, in counter-current, through the resins contained in container 58, providing to their regeneration. After such course, the water flows out through drain 32, opened by the lifting of piston 18.

The last operating stage, whose diagram is shown in FIG. 4, involves the washing of the resins, with the elimination of the excess salt present in the same. Shaft 28 comprising cam 24 is caused to rotate clockwise or counter-clockwise, in order to allow the lowering of piston 18 into seat 14 for the whole available stroke. The greater radius portion of the aforementioned cam shifts progressively from the lower end of piston 18 up to the point where said end meets shaft 28. The downward shift of piston 18 is realized by spring 46, which—compressed during the preceding stage—releases.

In these conditions, the washing of the resins in equicurrent takes place acording to the course indicated by the arrows, starting from the entry of the fluid which, coming from opening 30, in the beginning passes through the container 58 and flows then out from drain 32.

The further rotation of shaft 28 comprising cam 26, which causes the lowering of piston 26, according to the same modalities as those defined above for the lowering of piston 18, restores the operating or service condition of the device, after the regeneration of the resins.

FIGS. 5, 6 and 7 schematically show the same service, regeneration and washing stages of the resin in an automatic device which utilizes a valve or a Venturi injector for sucking a saline solution contained in a special container 23. Said container 23 is connected, through a pipe 25, to the Venturi ejector, located along sector 15, which causes seats 14, 16 of pistons 18, 20 to communicate.

In the schematized stage of FIG. 5, the raw water gets in body 12 through entry 30, passes through tank 58 containing the ion-exchanging resins, and flows out from drain 36; In this stage, both pistons 18, 20 are fully lowered.

In FIG. 6, which shows the regeneration stage of the resins, both pistons are raised; the raw water gets in ejector 19 and sucks the saline solution from cointainer 23. The salt, in a solution comprised by way of example between 10 and 15%, passes in counter-current through the resins of container 58, regenerating them, then flows out from drain 32.

FIG. 7 shows the end washing stage, with piston 18 lowered and piston 20 still raised; resins are washed in equicurrent by the water which gets in through entry 30 and flows then out from drain 32. In this stage, the passing water allows to automatically restore, if necessary, the level in container 23, communicating with sector 15.

The movement of shaft or shafts 28 comprising cams 24, 26 may be obtained by any system, such as, for instance, electric, magnetic or hydraulic motors, without excluding, besides, the possibility of hand activation.

Preferably, in the case of adoption of motor-units, said movement is scheduled by means of electric, electronic and/or volumetric devices, to perform the regeneration of the resins automatically, after a fixed period of time.

As can be inferred from the above, the advantages achieved by the invention are remarkable.

The device subject matter of this invention allows one to continuously carry on, possibly through automatic and scheduled sequences, the regeneration in counter-current of the resins contained in the same; particularly advantageous is the adoption of a valve body wherein two pistons slide, either alternately or at the same time, which pistons intercept or open the fluid delivery or drain pipe.

The presence of direct mechanical systems such as cams, which act on said pistons, prevents the danger of jams or blocks in the movement which causes the realization of alternate fluid flows. However, the invention, as described hereabove and claimed hereafter, has been proposed solely by way of example, meaning that the same is susceptible of many changes or variants, all of them falling in any case within the field of the invention scope. For instance, body 12 may be constituted by two distinct and separate columns wherein pistons 18, 20 slide, while cams 24, 26 may have a different configuration relatively to what is shown by way of example in the attached drawings. Lastly, possible structural inversions or alternative positionings of the components which form the whole device of this invention are also possible.

I claim:

1. An automatic device for a regeneration of a bed of ion-exchanging resins, the device comprising:

a valve body having vertically extending first and second sliding seats;

first and second pistons respectively disposed in said first and second sliding seats;

a shaft with first and second cams mounted thereon, said first and second cams being operationally associated with lower ends of the first and second pistons;

a support integral with a lower part of the valve body, said support supporting said shaft and being connected to a movement unit for the shaft, an upper part of the support being provided with first and second drilled extensions which are respectively engaged in a lower part of each of the first and second seats, the first and second pistons respectively protruding through the first and second extensions;

a plurality of first openings provided in a part of the valve body which houses the first piston, said first openings being extended as first tangs toward an outside of the body;

a plurality of second openings provided in an adjoining part of the valve body which houses the second piston, said second openings being extended as second tangs, each of said first and second openings being intercepted by said first and second pistons to define a plurality of sliding courses of a fluid;

a plurality of sealing toric rings fitted on each of said first and second pistons so as to correspond to each of said first and second openings;

a common portion which communicates each of said first and second seats;

a tank arranged between the first and second seats so as to communicate the first and second seats, said tank containing a bed of ion-exchanging resins; and a container of solid salt arranged between and connected to each of said first and second seats.

2. A device according to claim 1, wherein, for each piston, a spring is fitted on the lower part of each of the piston which protrudes from the support.

3. A device according to claim 1, wherein the first and second seats are connected to a container of saline solution communicating through a pipe with a venturi ejector located along the common portion connecting said seats.

4. A device according to claim 1, wherein the movement unit of the shaft comprises an electric, magnetic or hydraulic motor connected to one or more devices selected from the group consisting of electric, electronic and volumetric devices for automatic and scheduled activation.

5. A device according to claim 1, further comprising a movement unit for the shaft wherein a movement of the movement unit for the shaft causes a rotation of the first and second cams so as to respectively slidably move the first and second pistons within each of the first and second seats, such that the first piston is movable between a first position in which one of the first openings is connected to the tank and another one of said first openings is closed, and a second position in which the one first opening is connected to the container and the another first opening is opened.

6. A device according to claim 5, wherein the tank is connectable to one of said second openings when the second piston is in a first position, and to the container when the second piston is in a second position.

7. An automatic device for a regeneration of a bed of ion-exchanging resins, the device comprising:

a valve body having vertically extending first and second sliding seats;

first and second pistons respectively disposed in said first and second sliding seats;

at least one shaft with first and second cams mounted thereon, said first and second cams being operationally associated with lower ends of the first and second pistons;

a support integral with a lower part of the valve body, said support supporting said at least one shaft;

a plurality of first openings provided in a part of the valve body which houses the first piston;

a plurality of second openings provided in an adjoining part of the valve body which houses the second piston, each of said first and second openings being intercepted by said first and second pistons to define a plurality of sliding courses of a fluid;

a tank arranged between the first and second seats, said tank containing a bed of ion-exchanging resins and being connected to an upper portion of each of said first and second seats; and a container of salt connected to a lower portion of each of said first and second seats.

* * * * *